United States Patent [19]
Levitt

[11] 3,931,865
[45] Jan. 13, 1976

[54] MOSQUITO REPELLANT APPARATUS
[76] Inventor: Robert Levitt, 5733 N. Sheridan, Chicago, Ill. 60660
[22] Filed: Mar. 18, 1974
[21] Appl. No.: 452,043

Related U.S. Application Data
[63] Continuation of Ser. No. 291,747, Sept. 25, 1972, abandoned.

[52] U.S. Cl.......................... 181/.5; 340/15; 43/107
[51] Int. Cl.²......................................... A01N 23/00
[58] Field of Search........ 340/3 A, 15; 43/131, 132, 43/124, 107; 181/.5 R; 119/1

[56] References Cited
UNITED STATES PATENTS

| | | | |
|---|---|---|---|
| 2,861,132 | 11/1958 | Kahn et al. | 43/107 |
| 2,928,204 | 3/1960 | Kahn et al. | 43/107 |
| 3,058,103 | 10/1962 | Evans | 340/15 |
| 3,557,899 | 1/1974 | Longinette et al. | 181/.5 R |

OTHER PUBLICATIONS
Kahn et al., "The First Field Tests of Recorded Mosquito Sounds Used for Mosquito Destruction," 1949, pp. 811–825, Amer. Journ. Trop. Med., Vol. 29.
Time Magazine, "Sirens Song", 1948, p. 71.

Primary Examiner—Maynard R. Wilbur
Assistant Examiner—M. Moskowitz
Attorney, Agent, or Firm—Alter and Weiss

[57] ABSTRACT

An electronic mosquito repellant sonically or ultrasonically attracts male mosquitos. The presence of the male mosquitos repels the pregnant female mosquitos. The female mosquitos, as distinguished from the male mosquitos, are equipped with mandibles capable of piercing the skin of human beings. As a matter of fact, though, it is only the pregnant female mosquitos that require blood for incubation of the fertilized eggs that bite. Thus, the electronic device repels the biting female mosquito and precludes being bitten by mosquitos in an area covered by the output of the device.

3 Claims, 2 Drawing Figures

MOSQUITO REPELLANT APPARATUS

This is a continuation of application Ser. No. 291,747, filed on Sept. 25, 1972.

This invention relates to mosquito repellant apparatus and more particularly to electronic mosquito repellant apparatus which generates a signal found to attract male mosquitos and thereby repel the blood seeking, pregnant female mosquitos. Not only is the mosquito bite uncomfortable and always liable to infection, but very often mosquitos serve as carriers of diseases. Therefore, human beings have long sought for means of keeping mosquitos from biting them.

The most common presently used method of discouraging mosquitos from biting is the use of chemical repellants, either in salve, spray or liquid form. The difficulty with these types of repellants are multifold. Many people are allergic to the chemical repellants or are discomforted by the odors present in the repellant. Also, it is extremely difficult to adequately spray the exposed skin. Besides that, it is often necessary to spray clothes through which mosquitos can bite.

Another chemical method of repelling mosquitos is through the use of anti-insect bars which present an odor that is supposed to repel mosquitos. The difficulty with this type of repellant is that it must be used in an enclosure, because it does not perform adequately out-of-doors where the majority of the mosquitos are located.

It is also known in the art to use electronic devices to attract insects for entrapment purposes; however, such entrapment fails as an aid to an individual fisherman or group of fishermen located by a stream in the woods. The entrapment apparatus is sometimes used by a Municipality or other government agency for mosquito abatement purposes, rather than for repellant purposes.

Further electronic devices are known in the arts that are used for repelling rodents, for example. This is accomplished by recording the noises emitted by a frightened or agitated rodent and replaying the recording. The replay equipment, even if it is on a casette, is relatively unwieldy.

Accordingly, an object of the present invention is to proivde a unique electronic means for repelling insects.

A more particular object of the invention is to provide the small electronic sonic mosquito repellant.

Yet another object of the invention is to provide an ultrasonic generator which can be used to repel mosquitos within its effective range indoors or outdoors with equal facility.

Yet another object of the invention is to provide an electronic means for repelling mosquitos that bite; the electronic means is extremely small, portable and capable of being attached to the outside of one's clothing, to effectively prevent mosquitos from biting the transporter of the repelling means.

In accordance with a preferred embodiment of the present invention, the foregoing objects are accomplished by providing a small transistorized oscillator using an RC network to obtain the frequency required to drive a speaker and transmit a male mosquito attracting signal. The oscillator is powered by a standard small voltage battery. Fine frequency control is obtained through the use of a controllable, variable resistor in the RC network.

The transistorized oscillator and the speaker are encased in a plastic case such as is normally provided for small transistor radios. The case is equipped to be attached to the belt or other outside appurtenance of the transporter's clothing.

These and other objects and features of the invention will now be explained in detail with the aid of the accompanying drawings, wherein.

The equipment illustrated and described herein uniquely repels the blood sucking mosquitos in an area of approximately 8 feet of the source of the signal. Since these mosquitos avoid the area within the range of the repellant apparatus, the use of the apparatus is relatively free of the danger of being bitten.

For background information, entomologists know that it is only the female mosquito which have piercing mandibles and are capable of biting a human. It is further known that it is only pregnant females that actually do the biting, because the biting is done when the pregnant female requires the blood for fertilized egg incubation purposes prior to laying her eggs. Entomological studies have further shown that a certain frequency of signals in the audible range and in the ultrasonic range attracts the male species of mosquitos. It is also known that once a female mosquito is pregnant, she is repelled by the presence of the male. Consequently, by producing the specific signal that attracts the male, the pregnant female will be repelled; thus, the device described and shown herein is designed to attract the male mosquitos. It should be noted that since the apparatus attracts the male mosquitos, these in turn attract the unpregnant female mosquitos; however, neither the male mosquitos nor the unpregnant female mosquitos are of any concern since neither of these mosquitos will bite the human being.

Figure 1:
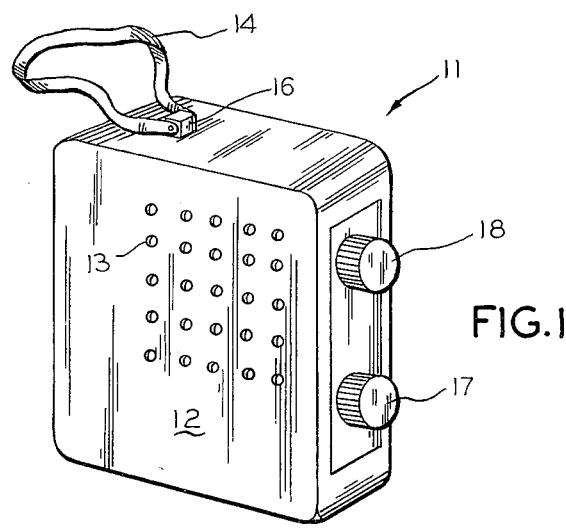
FIG. 1 is a pictorial view of the electronic mosquito repellant.

As shown in FIG. 1, the electronic mosquito repellant 11 comprises an outer case 12 which may be made of plastic or the like, having openings 13 therein to enable the output of a loud speaker to pass therethrough. The case 12 is further provided with means for attaching the electronic mosquito repellant to the clothing of the person using the device. The means shown are leather tong 14 attached to the case 12 through rivet 16.

Controls are provided for the operation of the electronic mosquito repellant. More particularly there is shown an on-off switch 17 and a variable resistor control 18.

Figure 2:
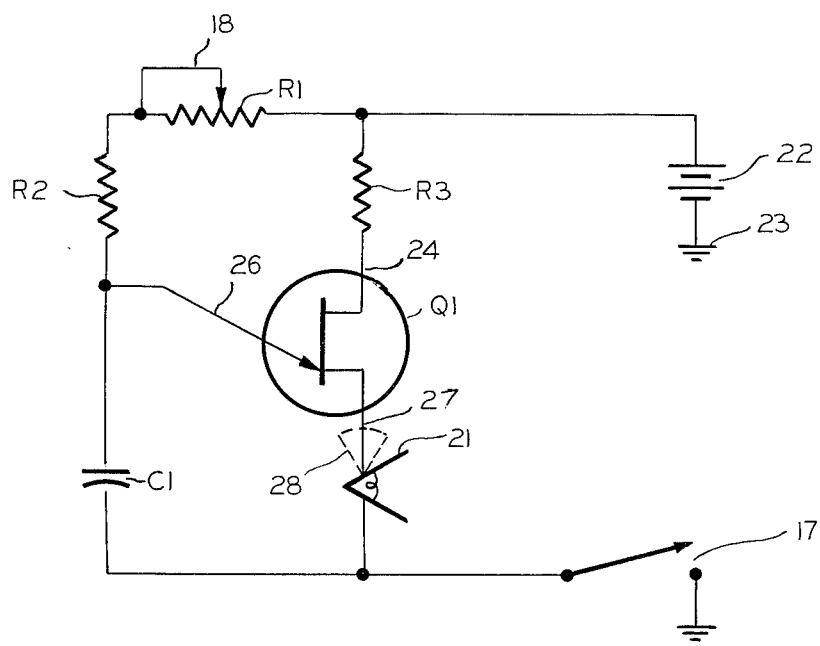
FIG. 2 is a schematic diagram of the electrical components included within the case shown in FIG. 1.

The circuitry of the device is shown in FIG. 2. Means are provided for obtaining the frequency required. More particularly, a resistance capacitor network is provided comprising a variable resistor R1, a fixed resistor R2 and capacitor C1. This network operates in conjunction with unijunction transistor Q1 to provide a signal through loud speaker 21.

The circuitry is energized by any well known means, such as a battery 22 which is grounded at point 23. The positive end of the battery is connected through bias resistor R3 to the base one element 24 of unijunction Q1. The emitter 26 of unijunction Q1 is coupled between the series connector resistance R2 and C1 to the base of the transistor Q1.

Control 18 on the variable resistor R1 is designed to vary the frequency below and above the normal optimum frequency positions. The optimum frequency position is at the midpoint of resistor R1.

The switch 17 couples the side of the speaker 21 that is not connected to the unijunction transistor Q1 to ground to complete the circuit through the transistor. In addition, also connected to ground is capacitor C1. Thus, when switch 17 is in its closed position, the circuitry is completed to operate the frequency generator and generate a signal which attracts the male mosquitos and thereby repels the pregnant female mosquitos.

An amplifier 28 may be provided as shown in dashed line form to increase the volume of the signal and thereby increase the range of the device.

Without the amplifier the effective range of the device, depending upon the strength of the battery, is up to 8 feet. A normal 9 volt transistor radio battery is found to last through 100 hours of use.

The optimum frequency has been found to be 2400 Hertz. It has also been found that the device operates over the 10,000 Hertz range; however, it is not found to be as desirable an operating point since, the ultrasonic frequency range often disturbs domestic pets.

In operation the on-off switch 17 is turned to its on position and variable control 18 of variable resistor R1 is turned to approximately the middle of the variable resistor. At that point, the frequency is designed to be approximately 2400 Hertz.

The frequency generator operates as a relaxation oscillator. More particularly, at the start of a cycle the emitter element 26 of unijunction Q1 is reverse biased and accordingly does not conduct. As the capacitor C1 charges through the series combination of resistors R1, R2 the emitter 26 becomes forward biased and consequently conducts to discharge the capacitor through base two electrode 27 and loudspeaker 21 to ground. The charging and discharging continues cyclically to provide a non-sinusoidal output wave.

The operation is checked by noticing mosquitos in the area. They will tend to collect at the outer limit of the effective range of the repellant frequency generator; thus, with a new battery in, the mosquitos will tend to mass approximately 8 feet from the emitting, turned on device.

Ocassionally it is necessary to slightly vary the resistor R1 to account for variations of values of the capacitor and the resistance due to atmospheric conditions, or to variations in the range of the variations in the effective signal reaching the mosquitos because of atmospheric conditions. Thus, if the user notices that the male mosquitos are not being attracted, he merely operates control 18 until he notices a slight massing of mosquitos. Then the user is relatively free from mosquito bites, even in the vicinity of multitudes of biting mosquitos, without the necessity of foul smelling chemical repellants.

In a preferred embodiment of the invention the following components are used:

R1 = 50 K Ohms
R2 = 2.7 K Ohms
R3 = 200 Ohms
C1 = .005 uF
Q1 is a 2N4870 unijunctor
9 Volt dc battery is used While the principals of the invention are described above in connection with the specific apparatus and applications, it is to be understood that this description is made only by way of example and not to the limitation of the scope of the invention.

I claim:

1. Electronic apparatus for repelling mosquitos that tend to bite humans,
said apparatus comprising:
attracting means not in conjunction with killing means for attracting male mosquitos, said attracting means comprising
relaxation oscillator means for generating a frequency signal;
non-directional means for broadcasting said generated frequency signal;
said frequency attracting male mosquitos;
resistor capacitor network means for varying said frequency by varying the resistance in said resistor capacitor network means to thereby obtain the optimum frequency for attracting male mosquitos;
battery means for energizing said oscillator means, whereby said apparatus is completely portable;
means for selectively connecting said oscillator means to said battery means;
plastic case means enclosing said apparatus; and
means for attaching said case to the clothing of the user; whereby the user has hands-free apparatus acting to repel mosquitos that tend to bite humans.

2. The apparatus of claim 1 wherein
said non-directional means for broadcasting comprises loudspeaker means,
said relaxation oscillator means comprises a unijunction transistor,
means for connecting said battery means to said resistor capacitor network means,
said resistor capacitor network means comprises a series connected resistor means and capacitor means,
means for coupling the emitter of said unijunction transistor to the junction of said resistor means and said capacitor means, and
means for connecting the base one electrode of said unijunction transistor to the means for connecting said battery means to said resistor capacitor network means.

3. The apparatus of claim 2 wherein said attaching means comprises a thong connected to said case.

* * * * *